United States Patent
Kondo

(10) Patent No.: US 7,338,998 B2
(45) Date of Patent: Mar. 4, 2008

(54) CEMENT FOR MODIFICATION OF RUBBER ARTICLES AND PROCESS FOR PRODUCTION THEREOF

(75) Inventor: Yoichiro Kondo, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 28 days.

(21) Appl. No.: 10/503,468

(22) PCT Filed: Feb. 5, 2003

(86) PCT No.: PCT/JP03/01177

§ 371 (c)(1),
(2), (4) Date: May 9, 2005

(87) PCT Pub. No.: WO03/066726

PCT Pub. Date: Aug. 14, 2003

(65) Prior Publication Data

US 2005/0222315 A1    Oct. 6, 2005

(30) Foreign Application Priority Data

Feb. 5, 2002   (JP) .............................. 2002-028562

(51) Int. Cl.
*C08L 1/00*   (2006.01)
(52) U.S. Cl. ...................... 524/425; 524/432; 524/435; 524/445; 524/451
(58) Field of Classification Search ................ 524/425, 524/432, 435, 445, 457
See application file for complete search history.

(56) References Cited

U.S. PATENT DOCUMENTS

2001/0007011 A1 *   7/2001   Kanoh et al. ............... 526/335

FOREIGN PATENT DOCUMENTS

| JP | 07-26068 A | 1/1995 |
|---|---|---|
| JP | 2001-62934 A | 3/2001 |
| JP | 2000-100619 | * 10/2001 |
| JP | 2001-288434 A | 10/2001 |

* cited by examiner

*Primary Examiner*—Robert D. Harlan
(74) *Attorney, Agent, or Firm*—Sughrue Mion, PLLC

(57) ABSTRACT

A process for producing a cement for adjusting a rubber product comprising 100 parts by weight of a rubber component and 10 to 500 parts by weight of an inorganic filler. In the first mixing step, the rubber component and components for compounding are mixed while the amount of the inorganic filler is kept in the range of 0 to 20 parts by weight per 100 parts by weight of the rubber component. In the second mixing step, (1) the remaining amount of the inorganic filler is mixed using a closed mixing machine, or (2) a master batch of the inorganic filler and the rubber component is mixed in a solution. Since an inorganic filler having a great specific gravity can be mixed in a great amount, a cement containing a solid component having a great specific gravity and providing a coating film exhibiting improved resistance to heat degradation can be produced efficiently.

7 Claims, No Drawings

CEMENT FOR MODIFICATION OF RUBBER ARTICLES AND PROCESS FOR PRODUCTION THEREOF

TECHNICAL FIELD

The present invention relates to a cement for adjusting a rubber product and a process for producing the cement. More particularly, the present invention relates to a cement for adjusting the balance of a tire and a process for producing the cement.

BACKGROUND ART

In general, a rubber cement prepared by dissolving a rubber composition in an organic solvent under stirring is used as the cement for adjusting a rubber product. The cement is used, for example, by coating the inner face of a tire to repair cracks or to adjust the balance of the tire. Heretofore, as the rubber composition for the above cement, rubber compositions for a cement of the room temperature curing type which are obtained by mixing a filler having a great specific gravity to a rubber and are crosslinked with sulfur or a peroxide have been used as described, for example, in Japanese Patent Application Laid-Open No. Showa 56(1981)-079134.

However, it is necessary for a cement for adjusting the balance of a tire that a filler having a great specific gravity in the powder form be mixed in a great amount so that the solid component of the cement has a great specific gravity. Due to this requirement, dispersion of components of compounding becomes difficult in the mixing stop of rubber, and the amount of the filler used for the mixing is practically limited when the dispersion and the productivity are considered.

When the specific gravity of the solid component of the cement is excessively small, it is necessary that application and drying of the cement be repeated many times to adjust the balance, and it takes great labor and a long time to adjust the tire. There is the possibility that the environment of the working deteriorates due to the increase in the amount of the organic solvent used. Moreover, in the case of the cement of the room temperature curing type, a problem arises in that crack are formed at the inside of the tire due to heat degradation during the use of the tire when the vulcanization system is not selected suitably.

DISCLOSURE OF THE INVENTION

Under the above circumstances, the present invention has an object of providing a cement which contains a solid component having a great specific gravity due to a great content of an inorganic filler having a great specific gravity, can be produced efficiently and provides a coating film exhibiting improved resistance to heat degradation and a process for producing the cement.

As the result of intensive studies by the present inventors, it was found that improving the step of mixing the inorganic filler was effective. The present invention has been completed based on this knowledge.

The present invention provides a process for producing a cement for adjusting a rubber product comprising 100 parts by weight of a rubber component and 100 to 500 parts by weight of an inorganic filler, the process comprising: in a first mixing step, mixing the rubber component and components for compounding while an amount of the inorganic filler is kept in a range of 0 to 20 parts by weight per 100 parts by weight of the rubber component; in a second mixing step, mixing a remaining amount of the inorganic filler using a closed mixing machine; and dissolving an obtained rubber composition into an organic solvent.

The present invention also provides a process for producing a cement for adjusting a rubber product comprising 100 parts by weight of a rubber component and 100 to 500 parts by weight of an inorganic filler, the process comprising mixing in an organic solvent (1) a rubber composition obtained by mixing a rubber component and components for compounding while an amount of the inorganic filler is kept in a range of 0 to 20 parts by weight per 100 parts by weight of the rubber component and (2) a master batch comprising the inorganic filler and the rubber component.

The present invention also provides a cement obtained in accordance with any one of the above processes and a rubber product obtained by using the cement. In particular, the present invention provides a cement for adjusting a tire and a tire adjusted by using the cement.

THE MOST PREFERRED EMBODIMENT TO CARRY OUT THE INVENTION

The cement for a rubber product of the present invention is produced by dissolving a rubber composition comprising 100 parts by weight of a rubber component and 100 to 500 parts by weight of an inorganic filler in an organic solvent. In the first step, it is necessary that a rubber and other components for compounding be mixed while the amount of the inorganic filler is kept in the range of 0 to 20 parts by weight per 100 parts by weight of the rubber composition. The remaining amount of the inorganic filler is mixed in the second step which will be described later.

In the first step, no inorganic filler is mixed or, even when the inorganic filler is mixed, 20 parts by weight or less of the inorganic filler per 100 parts by weight of the rubber component is mixed. When the amount of the inorganic filler exceeds the above range, dispersion is occasionally difficult in the mixing of the remaining amount of the inorganic filler in the second step.

In the first step, rubber and other components for compounding are mixed under the above condition. Other components for compounding which are not the inorganic filler are not particularly limited. Components conventionally used in the rubber industry such as carbon black, oils, tackifiers, stearic acid and antioxidants can be suitably used.

In the cement of the present invention, it is preferable that the cement comprises 1 to 90 parts by weight of carbon black per 100 parts by weight of the rubber component. The carbon black is not particularly limited. Examples of the carbon black include SRF, GPF, FEF, HAF, ISAF and SAF.

From the standpoint of improving adhesion with the portion of the rubber product coated with the cement, it is preferable that the cement comprises 1.0 to 40 parts by weight of a tackifier per 100 parts by weight of the rubber component. Examples of the tackifier include natural resins such as rosin-based resins and terpene-based resins and synthetic resins such as petroleum-based resins, phenol-based resins, coal-based resins and xylene-based, resins.

For the rubber component, natural rubber and various diene-based synthetic rubbers can be used. As the diene-based synthetic rubber, diene-based rubbers and diene-based copolymers such as butadiene-based polymers, isoprene-based polymers, butadiene-aromatic vinyl compound copolymers and isoprene-aromatic vinyl compound copolymers are preferable. Specific examples of the diene-based synthetic rubber include styrene-butadiene copolymer rubbers (SBR), butadiene rubber (BR), isoprene rubber (IR), butyl rubber (IIR), ethylene-propylene-diene copolymer rubber (EPDM) and mixtures of these rubbers.

For the mixing of the rubber and the inorganic filler in the first step, any of open rolls and closed mixing machines can be used.

The cement of the present invention can achieve a strength sufficient for causing no problems in the practical use without using crosslinking agents such as sulfur and peroxides. When a crosslinking agent is used, the resistance to heat aging is occasionally adversely affected. Therefore, it is preferable that the cement of the present invention is the non-crosslinking cement which does not depend on the crosslinking.

In the rubber composition obtained above, a great amount of the inorganic filler can be effectively dispersed in the rubber in the second step by (1) adding and mixing the prescribed amount of the above inorganic filler or (2) mixing in a solution a master batch of the inorganic filler which is prepared separately in advance.

In accordance with the process (1) described above, following the mixing in the first step, the remaining amount of the inorganic filler is mixed and dispersed in the second step so that the amount of the inorganic filler is adjusted in the range of 100 to 500 parts by weight per 100 parts by weight of the entire rubber component. For the mixing, it is necessary that a closed mixing machine such as a kneader or a Banbury mixer be used. Mixing by open rolls in the second step not only requires a long time for dispersion of a great amount of the inorganic filler but also causes difficulty in achieving a sufficiently great content of the inorganic filler.

In accordance with the process (2) described above, the rubber composition obtained in the first step which comprises 0 to 20 parts by weight of the inorganic filler is dissolved into an organic solvent together with a master batch comprising the inorganic filler prepared separately in advance so that the amount of the entire inorganic filler is adjusted in the range of 100 to 500 parts by weight per 100 parts by weight of the rubber component.

The process for preparing the master batch is not particularly limited. For example, the master batch can be prepared by mixing the prescribed amount of the desired inorganic filler under stirring into a latex of natural rubber or into a solution of a synthetic rubber obtained in the production of the rubber and removing water or the solvent from resultant mixture. The master batch can also be prepared by mixing the components by a mixer. The polymer component in the master batch may further comprise components other than the rubber component such as an ethylene-vinyl acetate copolymer (EVA).

The master batch is also commercially available. Examples of the commercially available master batch include a zinc oxide master batch composed of EPDM/EVA and zinc oxide manufactured by RHEIN CHEMIE Company (the trade name: REGNOLAN ZnO-80).

Preferable examples of the above inorganic filler used in the present invention include zinc oxide, lead oxide, clay, calcium carbonate, iron oxide, magnesium carbonate and talc. It is preferable that the inorganic filler is in a fine powder form having a diameter of 1.0 µm or smaller.

For the cement for adjusting balance of an automobile tire, in particular, it is not preferable that the specific gravity of the solid component (the rubber composition) of the cement is small since the thickness of the coating film of the cement at the inner face of the tire increases considerably. Therefore, it is preferable that the specific gravity of the solid component of the cement is 1.4 or greater.

As the solvent used for the above cement, the so-called rubber benzine widely used for applying adhesives on rubber products or a solvent containing industrial gasoline as the main component can be used.

When the cement of the present invention is applied, for example, to the inner face of a tire, the solid component (the rubber composition) is applied to the inner face using a brush or the like. When the cement is applied, it is preferable that a mold release present on the inner face of the tire is removed in advance.

The cement of the present invention can be applied to various rubber products. The cement can be advantageously applied for adjusting tires, vibration isolation rubbers, dock fenders, belts, hoses and other industrial products. In particular, the cement can be advantageously applied to adjusting tires.

EXAMPLES

The present invention will be described more specifically with reference to examples in the following. However, the present invention is not limited to the examples.

The effect of application of cements prepared in Comparative Examples and Examples were evaluated as follows.

The inner face of a tire of the size 205/60R16 was coated with a cement repeatedly until, the dynamic balance was improved to show a decrease of 20 g as expressed by the total of the decreases at the outer side and the inner side, and the number of repeat of the coating was obtained.

Comparative Example 1

A rubber composition of the first step was prepared using a Banbury mixer in accordance with the formulation shown in Table 1. The prepared rubber composition was dissolved into rubber benzine under stirring, and a cement was prepared (the content of the solid component: 20% by weight). Using the prepared cement, the number of repeat of the coating required to decrease the dynamic balance by 20 g was obtained in accordance with the method described above. The result is shown in Table 1.

Comparative Example 2

To a rubber composition obtained in accordance with the same procedures as those conducted in the first step of Comparative Example 1, 100 parts by weight of zinc oxide was mixed by open rolls in the second step. The obtained rubber composition was dissolved into rubber benzine under stirring, and a cement was prepared. The obtained cement was applied to a tire in accordance with the same procedures as those conducted in Comparative Example 1, and the number of repeat of the coating was obtained. The result is shown in Table 1.

Example 1

A cement was prepared in accordance with the same procedures as those conducted in Comparative Example 2 except that 200 parts by weight of zinc oxide was mixed by a Banbury mixer in the second step. The obtained cement was applied to a tire in accordance with the same procedures as those conducted in Comparative Example 1, and the number of repeat of the coating required to decrease the dynamic balance by 20 g was obtained. The result is shown in Table 1.

Example 2

A cement was prepared in accordance with the same procedures as those conducted in Comparative Example 2 except that 300 parts by weight of zinc oxide was mixed by a kneader in the second step. The obtained cement was applied to a tire in accordance with the same procedures as those conducted in Comparative Example 1, and the number of repeat of the coating was obtained. The result is shown in Table 1.

Examples 3 and 4

Rubber compositions of the first step were prepared using a Banbury mixer in accordance with the formulations shown in Examples 3 and 4 in Table 1. The prepared rubber compositions were dissolved into rubber benzine under stirring together with master batches containing EPDM/EVA and zinc oxide (the compositions thereof shown in Table 1), and cements were prepared (the content of the solid component: 20% by weight). Using the prepared cements, the number of repeat of the coating required to decrease the dynamic balance by 20 g was obtained in accordance with the method described above. The results are shown in Table 1.

amount of an inorganic filler having a great specific gravity can be efficiently produced. When the cement is used as the cement for adjusting the balance of a tire, in particular, the number of repeat of the coating with the cement can be remarkably decreased. Therefore, the environment of the working can be improved, and the amount of working can be decreased. The resistance to heat aging of the coating layer of the cement can be improved since the cement is a non-crosslinking cement.

The invention claimed is:

1. A process for producing a cement for adjusting a rubber product comprising 100 parts by weight of a rubber component and 100 to 500 parts by weight of an inorganic filler per 100 parts by weight of the rubber component, the process comprising; in a first mixing step, mixing the rubber component and components for compounding while an amount of the inorganic filler is kept in a range of 20 parts by weight or less per 100 parts by weight of the rubber component; in a second mixing a remaining amount of the inorganic filler using a closed mixing machine; and dissolving an obtained rubber composition into an organic solvent.

2. A process for producing a cement for adjusting a rubber product comprising 100 parts by weight of a rubber com-

TABLE 1

|  | Comparative Example | | Example | | | |
| --- | --- | --- | --- | --- | --- | --- |
|  | 1 | 2 | 1 | 2 | 3 | 4 |
| Formulation (part by weight) | | | | | | |
| First step | | | | | | |
| natural rubber | 100 | 100 | 100 | 100 | 60 | 30 |
| carbon black HAF | 50 | 50 | 50 | 50 | 30 | 15 |
| stearic add | 1 | 1 | 1 | 1 | 0.6 | 0.3 |
| zinc oxide | 3 | 3 | 3 | 3 | 1.8 | 0.9 |
| HITANOL 1501*[1] | 10 | 10 | 10 | 10 | 6 | 3 |
| Second step | | | | | | |
| EPDM/EVA | — | — | — | — | 40*[2] | 70*[2] |
| zinc oxide | — | 100 | 200 | 300 | 200*[3] | 350*[3] |
| Means of mixing | | | | | | |
| (1) mechanical mixing | — | open rolls | Banbury | kneader | — | — |
| (mixing time, minute) | — | (50) | (10) | (5) | | |
| (2) mixing with master batch | — | — | — | — | mixing as solution | mixing as solution |
| Number of repeat of coating | 6 | 4 | 3 | 2 | 3 | 1 |

*[1] A tackifier (manufactured by HITACHI KASEI KOGYO Co., Ltd.)
*[2] Amount by part by weight of the polymer (EPDM/EVA) in the master batch
*[3] Amount by part by weight of zinc in the master batch It is shown by the above results that the number of repeat of the coating with the cement could be remarkably decreased in Examples of the present invention in comparison with that in Comparative Examples. Thus, it is shown that the amount of working and the time required to complete the adjustment could be remarkably decreased. In Comparative Example 2, 100 parts by weight of the inorganic filler was mixed by open rolls in the second step, and it was found that this amount of the inorganic filler was the upper limit with respect to the workability.

INDUSTRIAL APPLICABILITY

In accordance with the process of the present invention, a cement for adjusting a rubber product which contains a great ponent and 100 to 500 parts by weight of an inorganic filler, the process comprising mixing in an organic solvent (1) a rubber composition obtained by mixing a rubber component and components for compounding while an amount of the inorganic filler is kept in a range of 0 to 20 parts by weight per 100 parts by weight of the rubber component and (2) a master batch comprising the inorganic filler and the rubber component.

3. A process for producing a cement for adjusting a rubber product according to claim 1 or 2, wherein the inorganic filler is at least one compound selected from a group consisting of zinc oxide, lead oxide, iron oxide, clay, calcium carbonate, magnesium carbonate and talc.

4. A process for producing a cement for adjusting a rubber product according to claim 1 or 2, wherein the components for compounding comprise carbon black in an amount of 1 to 90 parts by weight per 100 parts by weight of the rubber component.

5. A process for producing a cement for adjusting a rubber product according to claim 1 or 2, wherein the cement is a non-crosslinking cement comprising no crosslinking agents.

6. A process for producing a cement for adjusting a rubber product according to claim 1 or 2, wherein a solid component of the cement has a specific gravity of 1.4 or greater.

7. A process for producing a cement for adjusting a rubber product according to claim 1 or 2, wherein the rubber product is a tire.

* * * * *